United States Patent [19]

Nakai et al.

[11] Patent Number: 5,362,957
[45] Date of Patent: Nov. 8, 1994

[54] IMAGE READING APPARATUS

[75] Inventors: Takehiko Nakai, Tokyo; Michitaka Setani, Kawasaki, both of Japan

[73] Assignee: Canon Kabushiki Kaisha, Tokyo, Japan

[21] Appl. No.: 64,875

[22] Filed: May 24, 1993

[30] Foreign Application Priority Data

Jun. 25, 1992 [JP] Japan .................. 4-193124

[51] Int. Cl.$^5$ ............................................. H01J 40/14
[52] U.S. Cl. .................... 250/208.1; 250/226; 359/566; 359/569; 359/571
[58] Field of Search ............ 250/208.1; 359/571; 358/515, 514, 471

[56] References Cited

U.S. PATENT DOCUMENTS 5,173,599 12/1992 Setani .................. 250/208.1
5,221,835 6/1993 Setani .................. 250/208.1
5,223,703 6/1993 Setani .................. 250/208.1

Primary Examiner—Edward L. Coles, Sr.
Assistant Examiner—John Ning
Attorney, Agent, or Firm—Fitzpatrick, Cella, Harper & Scinto

[57] ABSTRACT

An image reading apparatus is provided with a light-receiving device, an imaging optical system and a blazed diffraction grating. In the light-receiving device, a plurality of line sensors are arranged on the same substrate. An image of an object to be imaged is formed on the light-receiving device by the imaging optical system. The blazed diffraction grating is arranged in an optical path between the imaging optical system and the light-receiving device. The blazed diffraction grating color-separates a light beam from the object to be imaged into a plurality of light components. The diffraction grating is so constructed to have grating lines with at least two different grating heights.

18 Claims, 10 Drawing Sheets

MAIN SCANNING SECTION

SUB-SCANNING SECTION

SUB-SCANNING SECTION

SUB-SCANNING SECTION

SUB-SCANNING SECTION

IMAGE READING APPARATUS

BACKGROUND OF THE INVENTION

1. Field of the Invention

The present invention relates to a color image reading apparatus and, more particularly, to a color image reading apparatus suitable for, e.g., a color scanner or a color facsimile apparatus, which improves color reproducibility by using color-separating means constituted by a one-dimensional blazed diffraction grating and light-receiving means in which three line sensors are arranged on the surface of the same substrate, thereby reading color image information on the surface of an original with a high precision.

2. Related Background Art

A conventional apparatus for imaging color image information formed on the surface of an original onto the surface of a line sensor, such as a CCD, via an optical system, thereby digitally reading the color image information by using an output signal from the line sensor has been proposed in, e.g., Japanese Laid-Open Patent Application No. 2-214730.

FIGS. 1A and 1B are a plan view (main scanning section) and a side view (sub-scanning section), respectively, showing the main part of a conventional color image reading apparatus. FIG. 2 is a view for explaining a transmission-type one-dimensional blazed diffraction grating shown in FIGS. 1A and 1B.

Referring to FIGS. 1A and 1B, light beams from a color image formed on an original surface 61 are focused by a telecentric imaging optical system 62 and imaged on the surface of a three-line sensor 64 through a transmission one-dimensional blazed diffraction grating 63 for color separation. In this case, the light beams are separated into three colors, for example, blue (B), red (R), and green (G), and light components of these three colors are guided to the surfaces of line sensors 65, 66, and 67 each consisting of a CCD or the like. The color images formed on the surfaces of the line sensors 65, 66, and 67 are line-scanned in a sub-scanning direction, separately reading the individual light components of the respective colors.

In the above conventional color image reading apparatus, as shown in FIG. 2, the grating heights ($h_1$ to $h_3$) of a grating 63A of the one-dimensional blazed diffraction grating (to be also referred to as a "diffraction grating" hereinafter) for color separation are constant throughout the whole area of the diffraction grating. For this reason, the spectral characteristics of diffracted light components of the respective orders, spectrally separated by the diffraction grating 63, have waveforms (curves) BO (blue light component), GO (green light component), and RO (red light component) indicated by alternate long and short dashed lines shown in FIG. 3.

Referring to FIG. 3, BO, Go, and RO are set to be the +1st-order, −1st-order, and 0th-order light components, respectively.

Based on the principle of a diffraction grating, the spectral characteristics of these diffracted light components are such that at a peak wavelength $\lambda_G$ of the −1st-order diffracted light component (the spectral distribution of GO shown in FIG. 3), for example, the diffraction efficiencies of the other diffracted light components (the spectral distributions of BO and RO shown in FIG. 3) are very low, nearly 0.

Generally, in order for a color image reading apparatus to improve its color reproducibility and read color images with a high precision, it is desirable that the spectral characteristics of diffracted light components of the respective orders have waveforms B, G, and R with wide wavelength bands indicated by solid lines in FIGS. 3 and 4.

A comparison among the spectral characteristics of the color light components B, G, and R shown in FIG. 4 and those of the conventional color light components BO, GO, and RO shown in FIG. 3 reveals that the spectral characteristics of the color light components BO, GO, and RO which are spectrally separated by the conventional diffraction grating obviously have narrower bands. This gives rise to a problem of poor color separation characteristics: color reproducibility is impaired for some objects to be imaged, such as color photographs (images).

Note that in the one-dimensional blazed diffraction grating 63 shown in FIG. 2, the number of steps is four, each of the step film thicknesses (grating heights) $h_1$ to $h_3$ is 848.5 nm, and the angle of incidence of a light beam on the optical axis is 45°.

Generally, in performing color reproduction by using a color image reading apparatus, spectral characteristics (spectral distributions) are desirably such that the band width of each of B, G, and R light components is large as shown in FIG. 4. For this reason, widening the wavelength band of each diffracted light component is important in correctly reading color images.

SUMMARY OF THE INVENTION

It is an object of the present invention to provide a color image reading apparatus, in which a one-dimensional blazed diffraction grating is used as color-separating means to separate a color image into three color light components, and these color light components are guided onto the surface of light-receiving means (three-line sensor) to allow the light-receiving means to read the color image, and which can set the spectral characteristics of the three R, G, and B light components on the surface of the light-receiving means to have desired distributions by properly setting, e.g., the grating height and the number of steps of the diffraction grating, thereby digitally reading color images with a high precision.

The color image reading apparatus of the present invention, in which a color image is formed on the surface of light-receiving means, which is constituted by arranging three line sensors parallel to each other on the surface of the same substrate, by using an imaging optical system and is read by the light-receiving means, is characterized in that a one-dimensional blazed diffraction grating is arranged after the imaging optical system to separate a light beam from the imaging optical system into a plurality of color light components in a direction perpendicular to the direction of pixel arrays of the line sensors, guiding the individual color light components to the respective line sensors. In addition, the one-dimensional blazed diffraction grating is constituted by step-like structures, which are periodically repeated in the direction of color separation, and has grating lines with at least two different grating heights.

Also, the color image reading apparatus of the present invention, in which a color image is formed on the surface of light-receiving means, which is constituted by arranging three line sensors parallel to each other on the surface of the same substrate, by using an imaging optical system, and read by the light-receiving means, is characterized in that a one-dimensional blazed diffraction grating is arranged after the imaging optical system to separate a light beam from the imaging optical system into a plurality of color light components in a direction perpendicular to the direction of pixel arrays of the line sensors, guiding the individual color light components to their respective line sensors. In addition, the one-dimensional blazed diffraction grating has grating lines with different step structures, which are periodically repeated in the direction of color separation and have at least two different numbers of steps.

DETAILED DESCRIPTION OF THE PREFERRED EMBODIMENTS

Figure 5A:
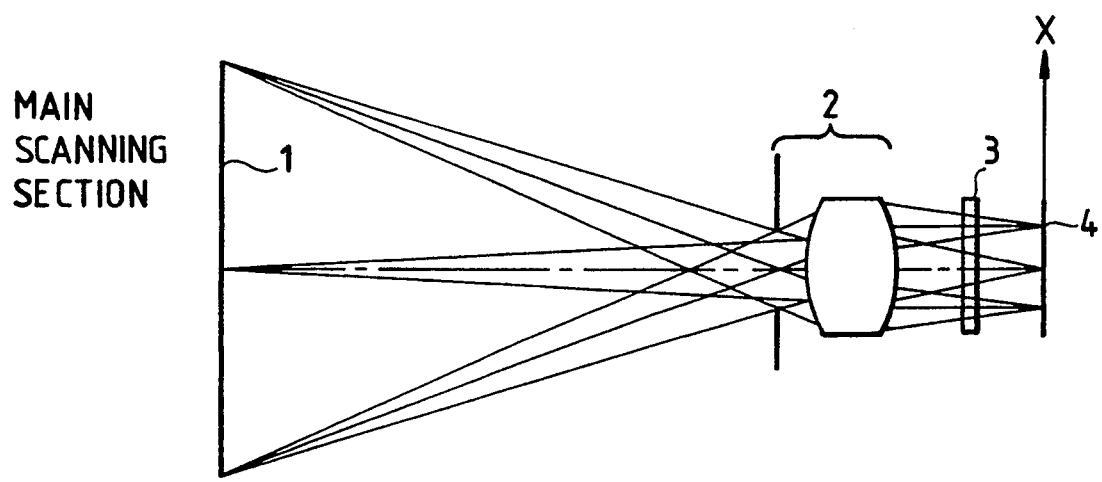
FIGS. 5A and 5B are plan and side views, respectively, showing the main part of one embodiment of an image reading apparatus according to the present invention.
Figure 5B:
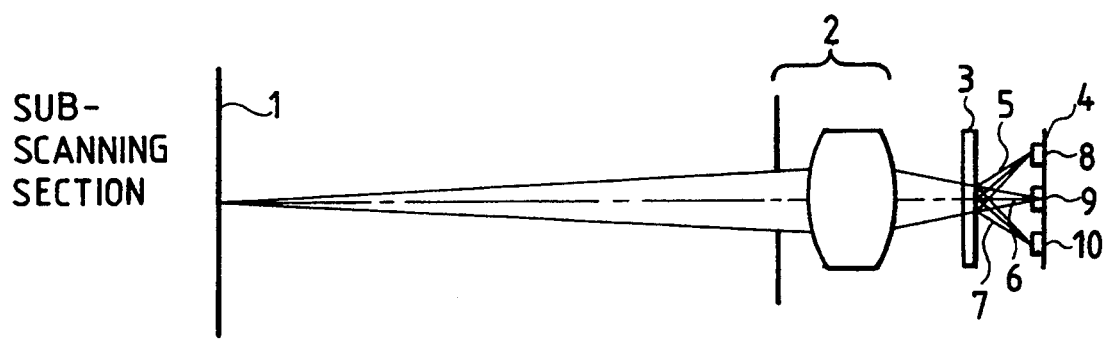
Figure 6:
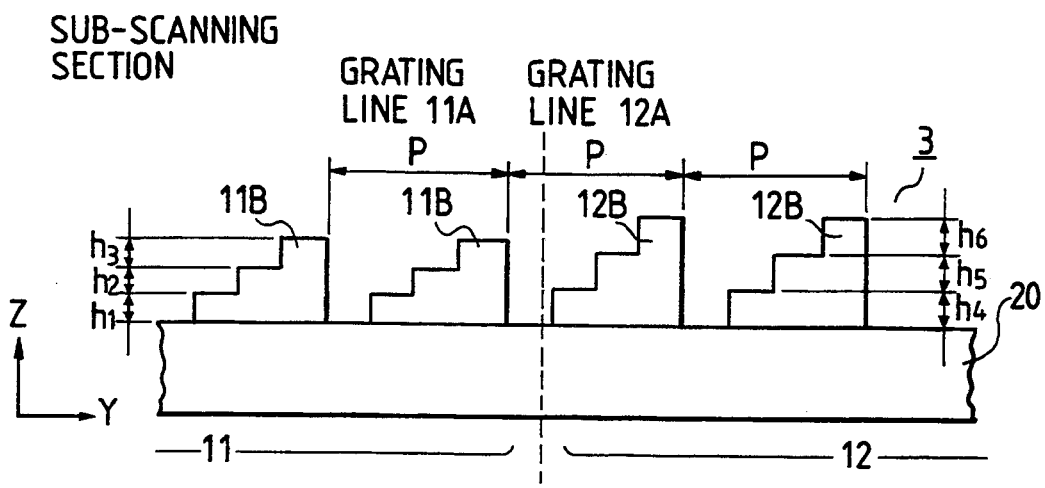
FIG. 6 is an enlarged view showing a portion of a diffraction grating shown in FIGS. 5A and 5B.
Figure 7:
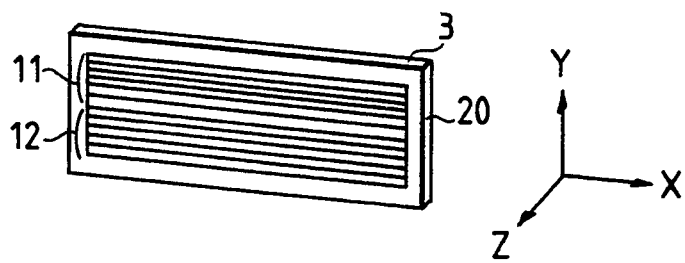
FIG. 7 is a perspective view showing the outer appearance of the diffraction grating shown in FIGS. 5A and 5B.

FIGS. 5A and 5B are a plan view (main scanning section) and a side view (sub-scanning section), respectively, showing the main part of one embodiment of an image reading apparatus according to the present invention. The sub-scanning section is a section including an optical axis and perpendicular to the main scanning section. FIG. 6 is an enlarged view for explaining a transmission-type one-dimensional blazed diffraction grating shown in FIGS. 5A and 5B, and FIG. 7 is a view showing the outer appearance of the diffraction grating.

Referring to FIGS. 5A and 5B, a color image is formed on an original surface 1 as an object to be imaged. An exit-type telecentric imaging optical system 2 focuses light beams based on the color image onto the surface of light-receiving means (monolithic three-line sensor) 4 through a transmission-type one-dimensional blazed diffraction grating 3 described below.

The color-separating means 3 is constituted by a transmission-type one-dimensional blazed diffraction grating (to be also referred to as a "diffraction grating" hereinafter). This diffraction grating consists of a plurality of step-like gratings having two different grating heights, as will be described later. The diffraction grating transmissively diffracts incident light beams, separating them into light components of predetermined colors, e.g., three primary colors R (red), G (green), and blue (B) in a sub-scanning direction perpendicular to the direction of pixel arrays of the line sensor.

The light-receiving means 4 is constituted by a so-called monolithic three-line sensor in which three line sensors (CCDs) 8, 9, and 10 are arranged parallel to each other on the surface of the same substrate with finite distances between them. Color filters (not shown) based on the respective color light components of the line sensors 8, 9, and 10 are formed on their surfaces. The line intervals between the line sensors 8, 9, and 10 are set at different values in correspondence with the directions of color separation of the color-separating means 3.

In this embodiment, a color image formed on the original surface 1 is line-scanned in the sub-scanning direction by scanning means via a mirror (not shown) or the like, provided between the original surface 1 and the imaging optical system 2, and light beams from the color image are guided by the imaging optical system 2. These light beams are color-separated into three color light components through the one-dimensional blazed diffraction grating 3, and an image of each color light component is formed on the surface of a corresponding one of the line sensors 8, 9, and 10. The light-receiving means 4 digitally reads the respective color images of the individual color light components.

That is, image information on the original surface 1 is read by moving the original surface 1 and the image reading apparatus (i.e., the imaging optical system 2, the one-dimensional blazed diffraction grating 3, and the light-receiving means 4) relative to each other in the sub-scanning direction.

The line sensors 8, 9, and 10 on the light-receiving means 4 extend in a main scanning direction, which is the X direction in FIG. 5A.

The one-dimensional blazed diffraction grating 3 is arranged in an optical path between the imaging optical system 2 and the light-receiving means 4. The diffraction grating 3 color-separates light from an object to be imaged into plurality of light components in the sub-scanning direction and guides these color-separated light components to the respective corresponding line sensors.

The original surface 1 is, of course, illuminated by an illumination light source (not shown) to read information on it.

As shown in FIGS. 5A and 5B, the transmission one-dimensional blazed diffraction grating 3 for color separation separates light beams, which are diffracted by the diffraction grating 3, into three directions of a −1st-order light component 5, a 0th-order light component 6, and a +1st-order light component 7, forming images of these light components, as light beams of convergent spherical waves formed by the imaging optical system 2, onto the surfaces of the line sensors 8, 9, and 10.

As disclosed in "Applied Optics," Vol. 17, No. 15, pp. 2,273 to 2,279 (Aug. 1st, 1979), light beams incident on the transmission one-dimensional blazed diffraction grating, as color-separating means, are transmission-diffracted and separated primarily into three directions.

As shown in FIG. 6, the diffraction grating 3 of this embodiment is constituted by step structures which are periodically repeated at a pitch P in the Y direction (sub-scanning direction) on a substrate 20. In addition, as shown in FIG. 7, the diffraction grating 3 is divided into two regions 11 and 12 in the Y direction (direction of color separation). The grating heights of a grating 11B in the region 11 and a grating 12B in the region 12 are set different from each other. That is, the grating height of a grating line 11A in the region 11 differs from that of a grating line 12A in the region 12 in the Z direction, as shown in FIG. 6.

As described above, this embodiment uses the diffraction grating 3 consisting of a plurality of gratings having two different grating heights as color-separating means.

The grating pitch P of the diffraction grating 3 of this embodiment is about 120 μm. A grating height h of a grating is set on the basis of Equation (1) below:

$$h = m\lambda_0/(nd-1) \tag{1}$$

where
nd: the refractive index of the diffraction grating
m: the film thickness constant
$\lambda_0$: the diffraction peak wavelength
A grating height is uniquely determined for a desired peak wavelength from Equation (1) above.

The peak wavelengths of ±1st-order diffracted light components are obtained by the following equations:

$$\lambda_{-1} = m\lambda_0/(m+1/n)$$

$$\lambda_{+1} = m\lambda_0/\{(m+1-1/n)\}$$

where
n: the number of steps
$\lambda_{-1}$: the peak wavelength of the −1st-order diffracted light component
$\lambda_{+1}$: the peak wavelength of the +1st-order diffracted light component The optical effect of the transmission diffraction grating 3 of this embodiment will be described below by using examples of numeric values.

Assume, for example, that the grating heights $h_1$ to $h_3$ of the grating line 11A in the region 11 are $h_1 = h_2 = h_3 = 2,324$ nm, the grating heights $h_4$ to $h_6$ of the grating line 12A in the region 12 are $h_4 = h_5 = h_6 = 2,402$ nm, the refractive index nd of the diffraction grating 3 is nd = 1.51633, m = 2, and n = 4. In this case, the peak wavelengths of light components of the respective orders, diffracted by the grating line 11A in the region 11, are $\lambda_0 = 600$ nm, = 532 nm, and $\lambda_{+1} = 436$ nm.

Likewise, the peak wavelengths of light components of the respective orders, diffracted by the grating line 12A in the region 12, are $\lambda_0 = 620$ nm, $\lambda_{-1} = 551$ nm, and $\lambda + 1 = 451$ nm. The spectral characteristics (spectral energy distributions) of the individual diffracted light components in this case are as shown in FIG. 8.

Figure 8:
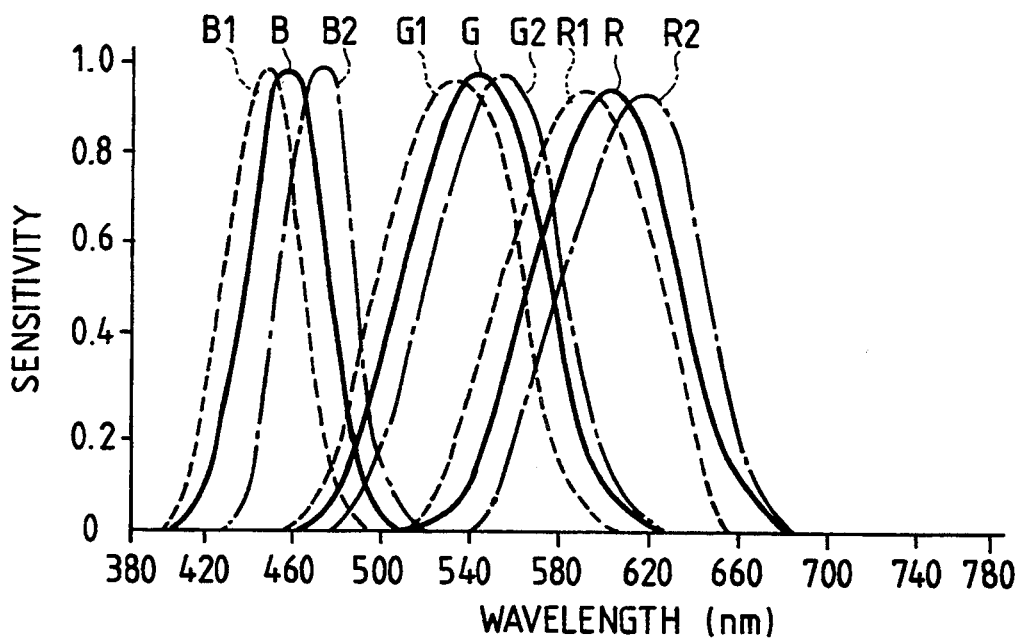
FIG. 8 is a graph for explaining the spectral characteristics of individual diffracted light components separated by the diffraction grating of the embodiment of the present invention shown in FIGS. 5A and 5B.

Referring to FIG. 8, waveforms B1, G1, and R1 indicate the spectral characteristics of diffracted light components which are color-separated by the grating line 11A, and waveforms B2, G2, and R2 indicate the spectral characteristics of diffracted light components which are color-separated by the grating line 12A.

Figure 1A:
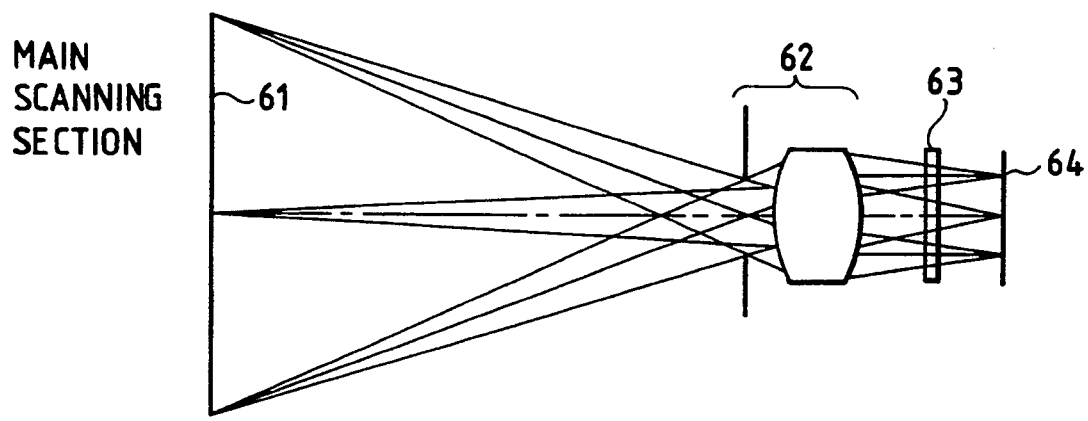
FIGS. 1A and 1B are plan and side views, respectively, showing the main part of a conventional color image reading apparatus.
Figure 1B:
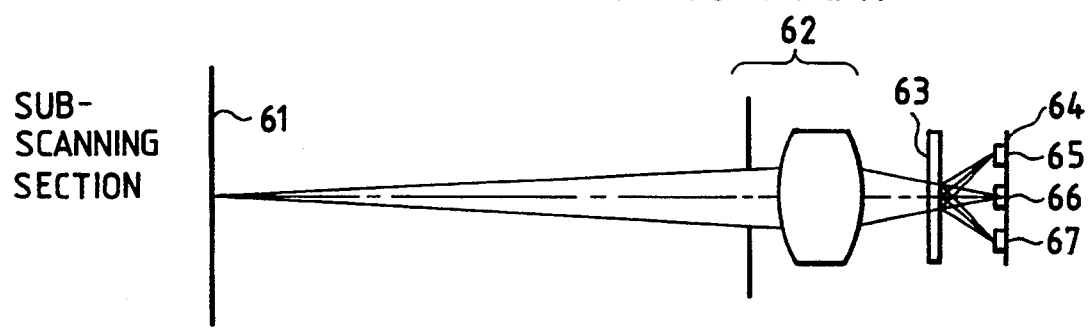
Figure 2:
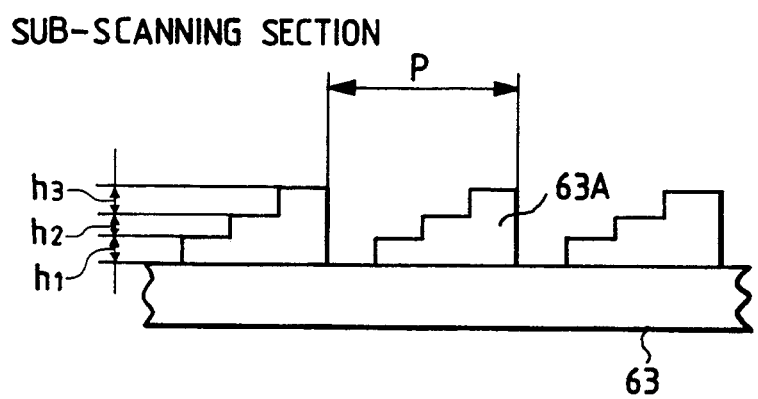
FIG. 2 is an enlarged view for explaining a portion of a conventional diffraction grating.
Figure 3:
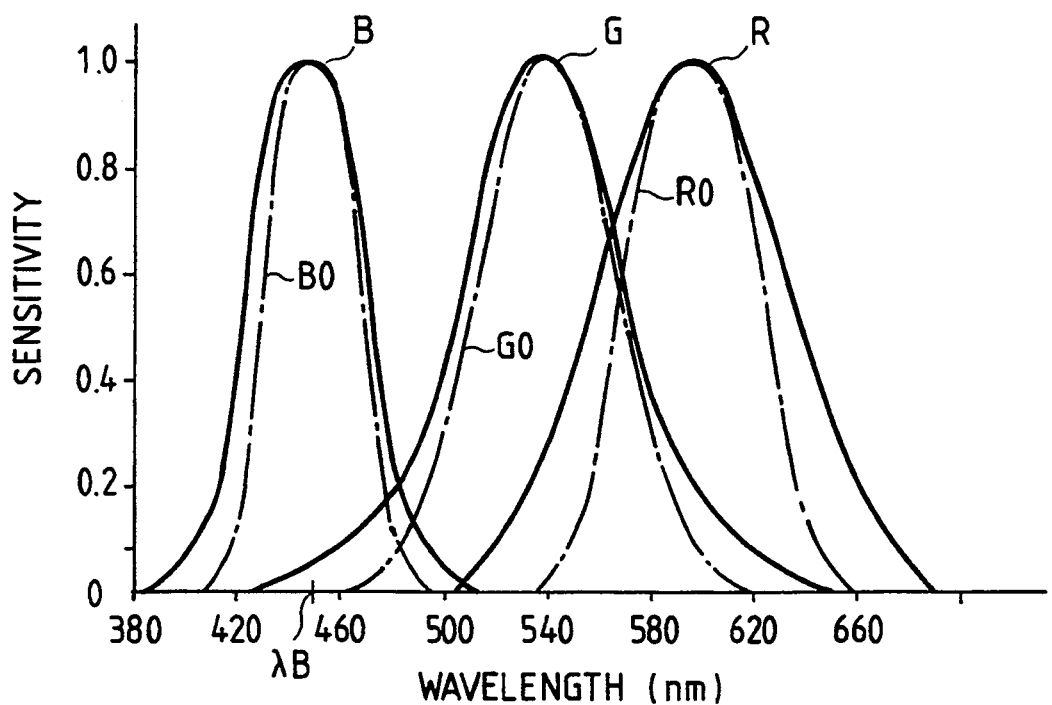
FIG. 3 is a graph for explaining the spectral characteristics of individual diffracted light components separated by the conventional diffraction grating shown in FIG. 2.
Figure 4:
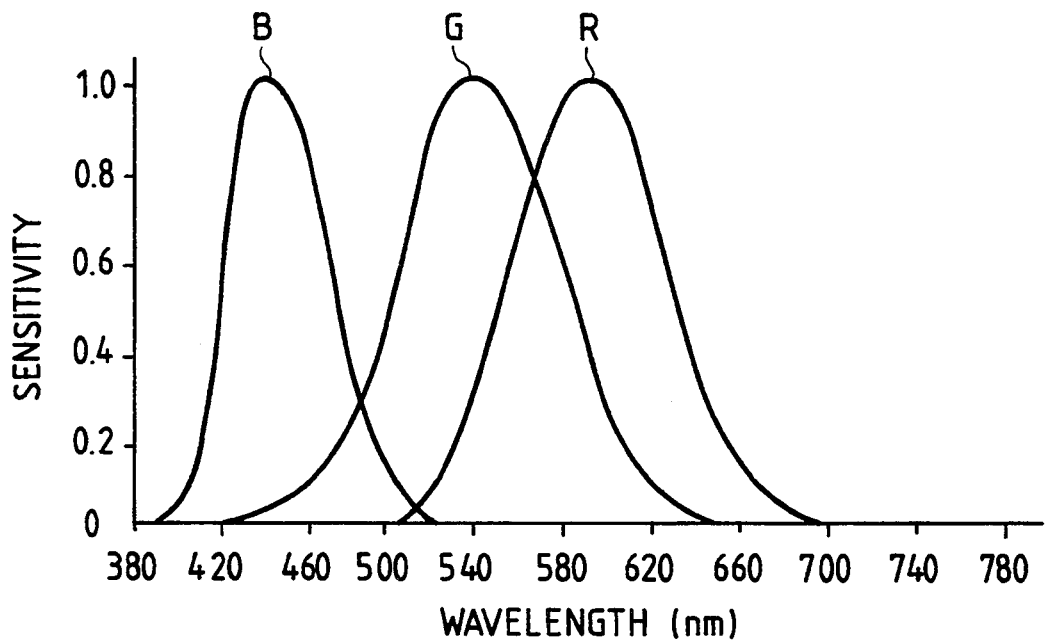
FIG. 4 is a graph for explaining desirable spectral characteristics.

The synthetic spectral characteristics obtained by the diffraction grating 3, therefore, which is formed by the grating lines 11A and 12A having different grating heights, become those indicated by waveforms B, G, and R. These synthetic spectral characteristics of the individual diffracted light components have a spectral width larger than that of the spectral characteristics of diffracted light components separated by a conventional diffraction grating having only one grating height. This allows the synthetic spectral characteristics to be substantially in agreement with the desired spectral characteristics shown in FIG. 4.

Note that in FIG. 8, it is assumed that B, B1, and B2 (blue light components) are +1st-order light components, G, G1, and G2 (green light components) are −1st-order light components, and R, R1, and R2 (red light components) are 0th-order light components.

In this embodiment, as described above, the diffraction grating 3 consisting of a plurality of grating lines having two different grating heights is used as color-separating means. Therefore, the spectral characteristics of light beams separated into R, G, and B light components can be set to have desired distributions on the surface of the three-line sensor 4. This improves color reproducibility and hence enables reading of color images with a high precision.

In the above embodiment, the transmission-type one-dimensional blazed diffraction grating has been described. The embodiment, however, can be similarly applied to a reflecting-type one-dimensional blazed diffraction grating, as will be described later in other embodiments of the present invention. In this case, the grating height h of the diffraction grating can be obtained from $h = m\lambda_0/2\cos\zeta$ ($\theta$: the incident angle of a light beam onto the diffraction grating).

A color image reading apparatus according to another embodiment of the present invention will be described below.

In the above-mentioned embodiment shown in FIG. 6, the diffracted light components 5, 6, and 7, which are color-separated by the diffraction grating 3, have different diffraction wavelengths in the diffracted light components B1, G1, and R1 and the diffracted light components B2, G2, and R2 from the grating lines having different grating heights because of the difference in grating height. For this reason, the arrival positions (image formation positions) of the light components, which are diffracted by the different grating heights, on the surfaces of the line sensors 8 and 10 corresponding to the ±1st-order light components 5 and 7, respectively, are slightly different from each other.

Figure 9:
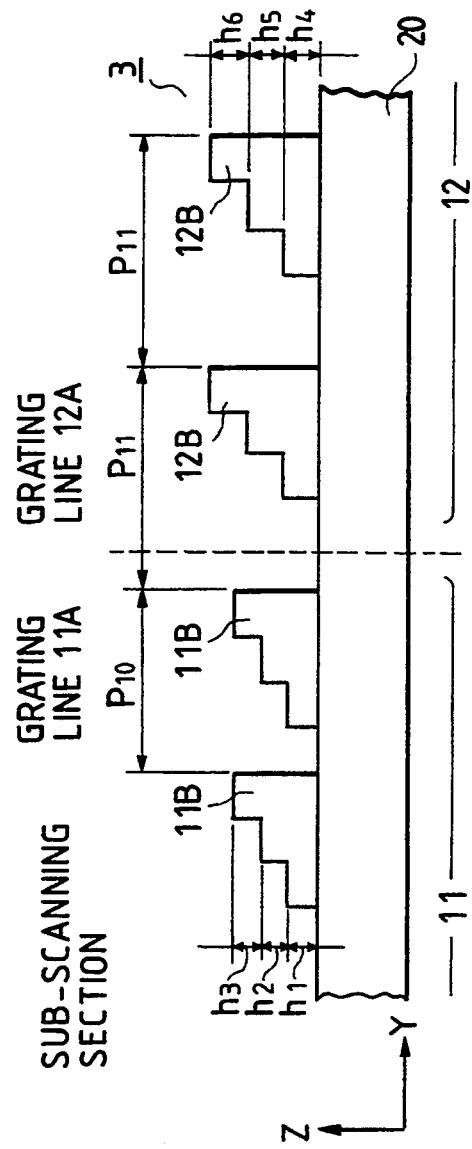
FIG. 9 is an enlarged view for explaining a portion of a diffraction grating according to another embodiment of the present invention.

In this embodiment, therefore, as shown in FIG. 9, in order to solve the above problem, the grating pitch is changed between grating lines having different grating heights, making a correction such that ±1st-order light components 5 and 7 correctly reach (form images on) the surfaces of line sensors 8 and 10, respectively. In this embodiment, the grating height of a grating line 12A is larger than that of a grating line 11A, and a grating pitch $P_{11}$ of the grating line 12A is larger than a grating pitch $P_{10}$ of the grating line 11A.

As described above, this embodiment reduces unsharpness on the surfaces of line sensors due to the difference in wavelength between the ±1st-order light components 5 and 7, reading color images with a high precision.

A color image reading apparatus according to still another embodiment of the present invention will be described below.

Figure 10:
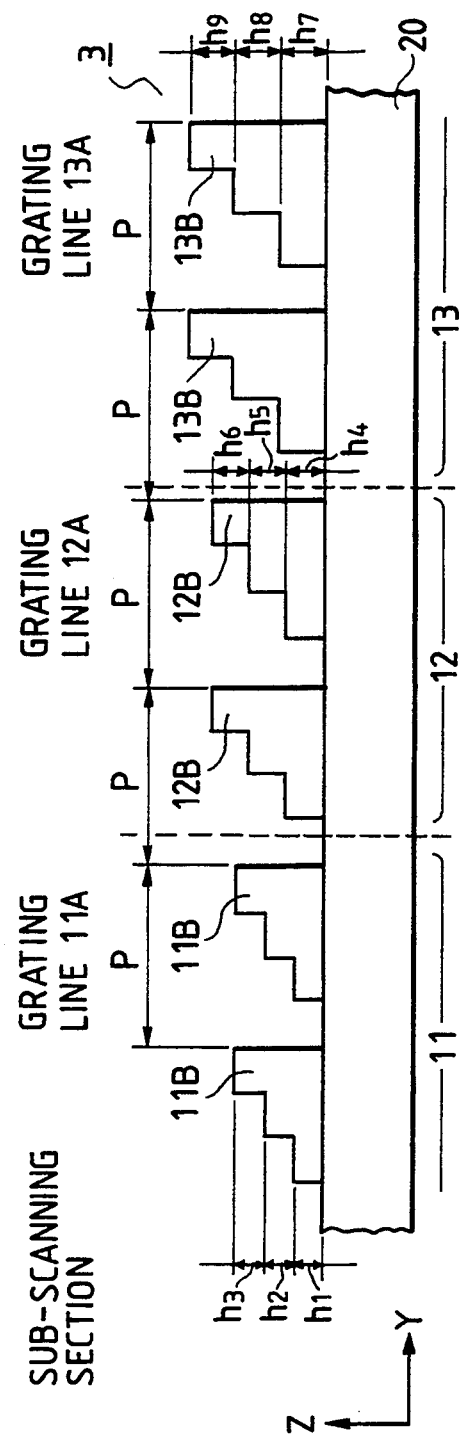
FIG. 10 is an enlarged view for explaining a portion of a diffraction grating according to still another embodiment of the present invention.

In the above-mentioned embodiment shown in FIG. 6, the diffraction grating 3 is divided into two regions in the direction of period (direction of color separation), and the gratings in the regions 11 and 12 have different grating heights. In this embodiment, however, as shown in FIG. 10, a diffraction grating is divided into three regions 11, 12, and 13, and these three regions have grating heights different from one another. In this embodiment, the grating heights of three grating lines 11A to 13A are set such that $h_1 = h_2 = h_3 < h_4 = h_5 = h_6 < h_7 = h_8 = h_9$.

That is, the contribution of spectral characteristics (spectral energy distributions) can be controlled easily by setting different ratios of grating lines having different grating heights on the surface of the diffraction grating. This facilitates a fine correction of the total spectral characteristics to achieve desired spectral characteristics, improving the read precision of color images.

A color image reading apparatus according to still another embodiment of the present invention will be described below.

Figure 11:
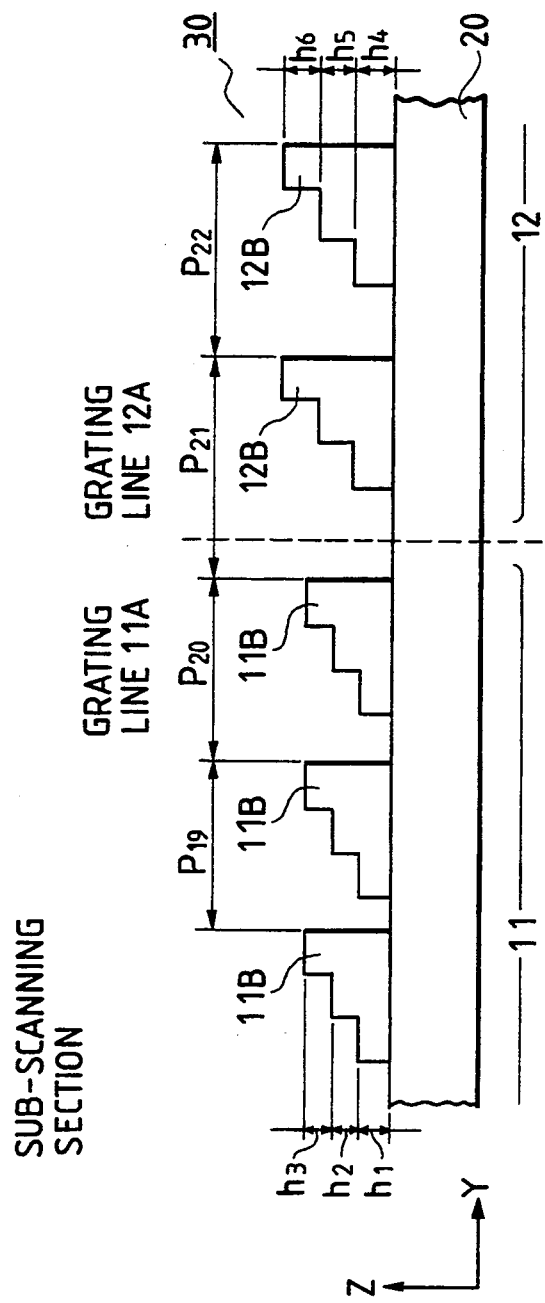
FIG. 11 is an enlarged view for explaining a portion of a diffraction grating according to still another embodiment of the present invention.

This embodiment shown in FIG. 11 constitutes an optical system by using a reflecting-type one-dimensional blazed diffraction grating as color-separating means.

In this reflecting-type diffraction grating, the grating pitch is varied not only between grating lines having different grating heights but also between gratings in the same region.

In this embodiment, a reflecting-type blazed diffraction grating 30 is divided into two regions 11 and 12, and gratings in these regions 11 and 12 are so formed as to have different grating heights. The grating pitch is varied between gratings in each region such that $P_{19} < P_{20}$, in the region 11, and $P_{21} > P_{22}$, in the region 12.

The above arrangement effectively removes unsharpness of ±1st-order diffracted light components on the surface of a line sensor due to the difference in angle of reflective diffraction caused by the difference in incident angle between light beams, resulting from NA (numerical aperture), thereby reading color images with a high precision.

Figure 12A:
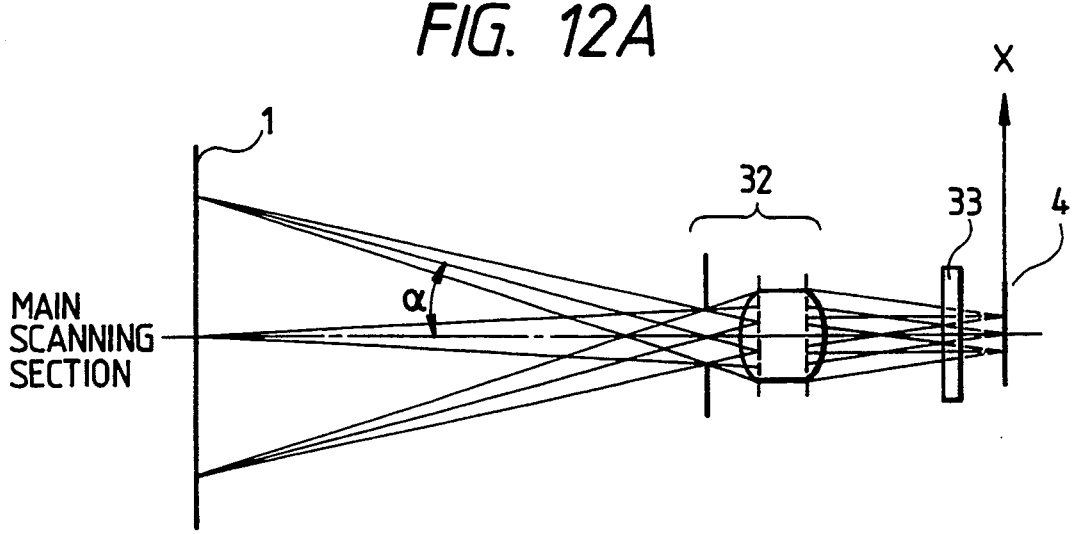
FIGS. 12A and 12B are plan and side views, respectively, showing still another embodiment of an image reading apparatus according to the present invention.
Figure 12B:
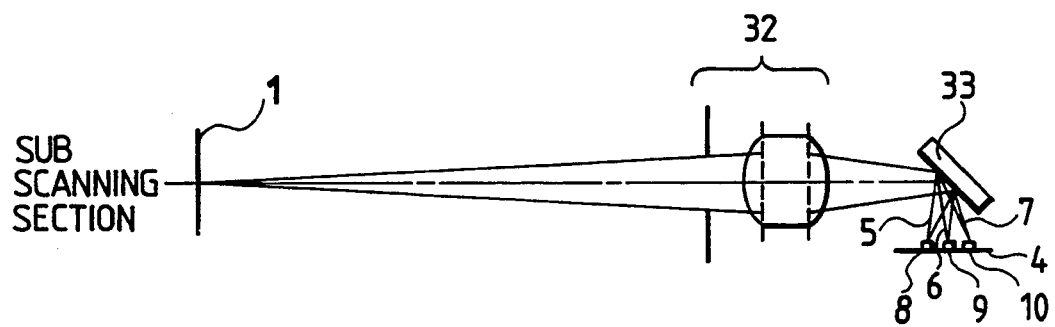

FIGS. 12A and 12B are a plan view (main scanning section) and a side view (sub-scanning section), respectively, showing the main part of still another embodiment of the color image reading apparatus according to the present invention.

Figure 13:
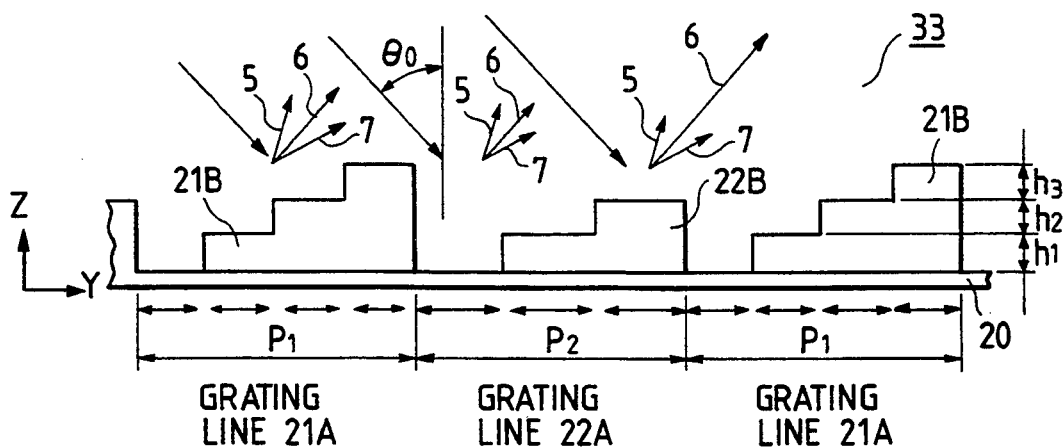
FIG. 13 is an enlarged view for explaining a portion of a diffraction grating shown in FIGS. 12A and 12B.
Figure 14:
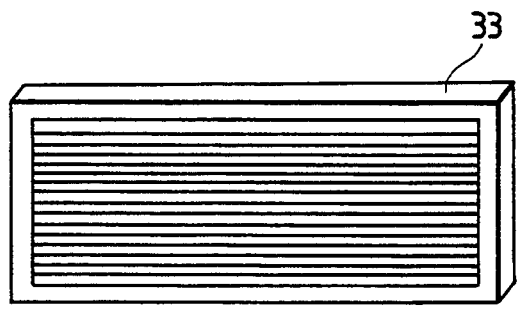
FIG. 14 is a perspective view showing the outer appearance of the diffraction grating shown in FIGS. 12A and 12B.

FIG. 13 is an enlarged view for explaining a portion of a reflecting-type one-dimensional blazed diffraction grating shown in FIGS. 12A and 12B, and FIG. 14 is a perspective view showing the outer appearance of the diffraction grating. Note that the same reference numerals as in FIGS. 5A, 5B and 6 denote the same parts in FIGS. 12A, 12B, and 13.

Referring to FIGS. 12A and 12B, an imaging optical system 32 of this embodiment constitutes a so-called exit-type telecentric system, in which a principal ray on the exit side emerges parallel to the optical axis. The imaging optical system 32 forms images of light beams based on a color image on the surface of light-receiving means (monolithic three-line sensor) 4 through a reflecting-type one-dimensional blazed diffraction grating 33 to be described below.

The color-separating means 33 is constituted by a reflecting-type one-dimensional blazed diffraction grating. This diffraction grating 33 is, as will be described later, constituted by a step structure formed by periodically, alternately repeating two gratings having different numbers of steps in the Y direction (direction of color separation) on a substrate 20. The diffraction grating 33 reflection-diffracts incident light beams in a direction perpendicular to the direction of pixel arrays of the line sensor 4, separating them into light components of predetermined colors, for example, three primary colors R (red), G (green), and B (blue).

In this embodiment, a color image formed on an original surface 1 is line-scanned by scanning means via a mirror (not shown) or the like arranged between the original surface 1 and the imaging optical system 32. Light beams from the color image are guided by the imaging optical system 32 and color-separated into three color light components via the one-dimensional blazed diffraction grating 33. Thereafter, a color image of each of these color light components is formed on the surface of a corresponding one of line sensors 8, 9, and 10. The light-receiving means 4 digitally reads the respective color images based on the individual color light components.

In this embodiment, as shown in FIG. 13, the reflecting-type diffraction grating 33 is constituted by a step structure in which a grating 21B having four steps and a grating 22B having three steps are periodically, alternately formed in the Y direction (direction of color separation) on the substrate 20. The depth (grating height) of each step of the grating 21B is set equal to that of each step of the grating 22B. In this embodiment, the grating heights of the individual steps of the gratings 21B and 22B are such that $h_1 = h_2 = h_3 = 849$ nm.

The optical effect of the reflecting-type diffraction grating 33 of this embodiment will be described below.

Figure 15:
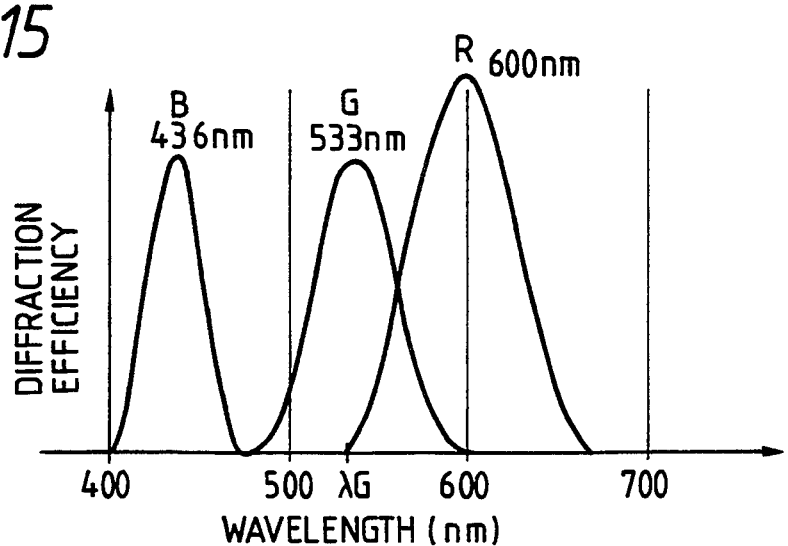
FIG. 15 is a graph for explaining the spectral characteristics of individual diffracted light components separated by the diffraction grating of the embodiment of the present invention shown in FIGS. 12A and 12B.

In this embodiment, the spectral characteristics (spectral distributions) of diffracted light components of the respective orders, color-separated by a four-step grating line 21A, are those indicated by waveforms B, G, and R shown in FIG. 15. These spectral characteristics coincide with the spectral characteristics of diffracted light components of the respective orders, which are color-separated by a conventional four-step diffraction grating.

Referring to FIG. 15, the 0th-order light is a red (R) light component whose wavelength indicating a peak diffraction efficiency, i.e., peak wavelength is 600 nm. Similarly, the +1st-order light is a blue (B) light component having a peak wavelength of 436 nm, and the −1st-order light is a green (G) light component having a peak wavelength of 533 nm.

Figure 16:
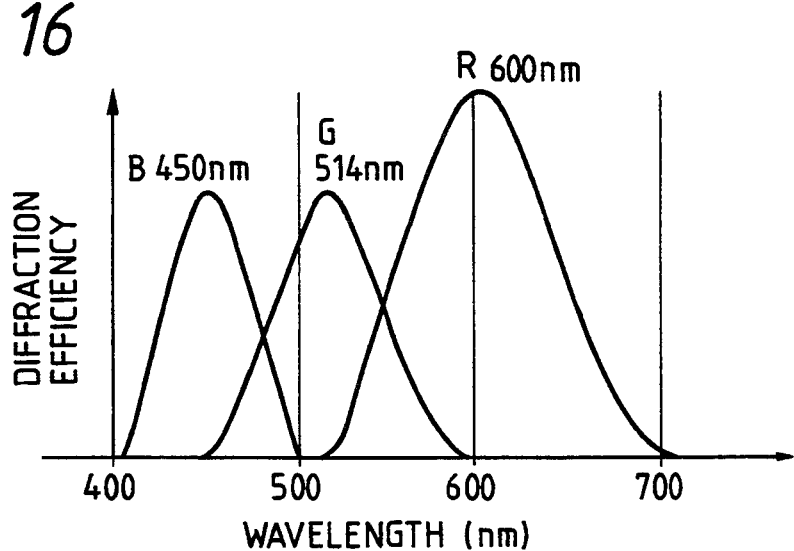
FIG. 16 is a graph for explaining the spectral characteristics of individual diffracted light components separated by the diffraction grating of the embodiment of the present invention shown in FIGS. 12A and 12B.

On the other hand, the spectral characteristics of diffracted light components of the respective orders, color-separated by a three-step diffraction grating 22A, are those indicated by waveforms B, G, and R shown in FIG. 16. Referring to FIG. 16, the peak wavelength of the 0th-order light (red light component) is 600 nm, that of the +1st-order light (blue light component) is 450 nm, and that of the −1st-order light (green light component) is 514 nm.

As described above, the peak wavelengths of the ±1st light components, color-separated by the grating lines 21A and 22A, are different from each other, and their wavelength bands also are different accordingly. Note that these peak wavelengths are calculated from the following approximate expressions.

That is, assuming that the number of steps is n, the diffraction constant is m (in this embodiment, 2), the peak wavelengths of the +1st-order, −1st-order, and 0th-order light components are $\lambda_{+1}$, $\lambda_{-1}$, and $\lambda_0$, respectively, and the angle of incidence of a light beam on the optical axis is $\theta_0$, the following relations are obtained:

$$\lambda_0 = 2h\cos\theta_0/m$$

$$\lambda_{+1} \approx m\lambda_0/(m+1/n)$$

$$\lambda_{-1} \approx m\lambda_0\{(m-(1/n-1)\}$$

The individual diffracted light components of the respective orders, color-separated by the diffraction grating 33 consisting of two types of gratings having different numbers of steps, are superposed together on the surface of the three-line sensor 4. As a result, good spectral characteristics as shown in FIG. 17 are obtained in this embodiment.

Figure 17:
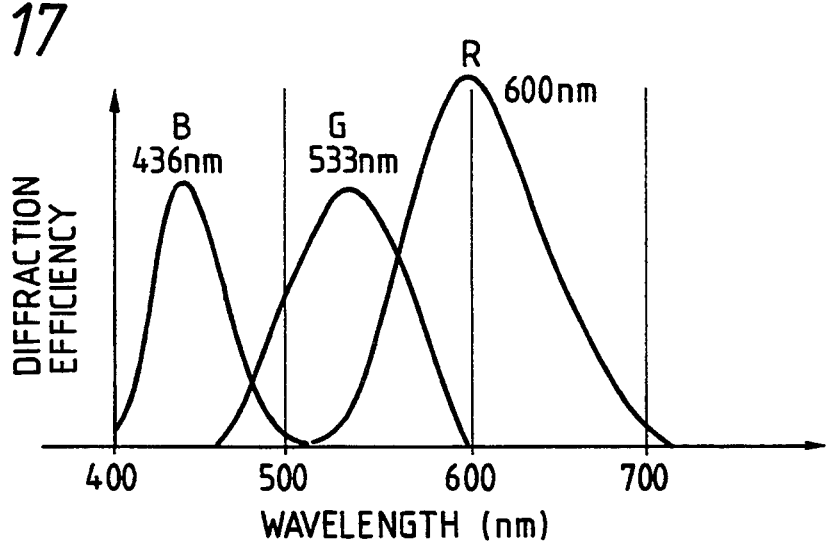
FIG. 17 is a graph for explaining the spectral characteristics of individual diffracted light components separated by the diffraction grating of the embodiment of the present invention shown in FIGS. 12A and 12B.

Since the diffraction efficiencies of the ±1st-order light components are different in this embodiment, as shown in FIG. 17, the peak wavelengths of light beams of the ±1st-order light components are determined by the wavelengths of diffracted light components, which are color-separated by the grating 21A, thereby obtaining desired peak wavelengths. In addition, the band widths of the spectral characteristics are increased by determining the individual wavelength bands in accordance with the spectral energies of diffracted light components, which are color-separated by the grating line 22A, thereby obtaining desired spectral characteristics. This improves the color reproducibility of color images and makes reading of color images with a high precision feasible.

A method of setting the grating pitches of the diffraction grating 33 having two different numbers of steps of this embodiment will be described below.

Since the peak wavelengths of the ±1st-order light components differ from each other as shown in FIGS. 15 and 16, the arrival positions (image formation positions) of the respective light beams on the surfaces of the corresponding line sensors 8 and 10 also are different accordingly.

In this embodiment, therefore, in order to correctly guide diffracted light components of the respective orders, color-separated by the diffraction grating 33, to the surfaces of the line sensors, the pitch width is varied for each single pitch in the pitch direction (Y direction) of the diffraction grating 33, thereby solving the above problem.

That is, in this embodiment, assuming the distance from the surface of the diffraction grating 33 to the surface of the line sensor 4 is 50 mm, grating pitches $P_1$ and $P_2$ of the grating lines 21A and 22A are set to 157.5 $\mu$m and 153 $\mu$m, respectively. This arrangement effectively removes unsharpness corresponding to the difference between image formation positions on the surface of the three-line sensor 4, which results from the difference in peak wavelength between the ±1st-order light components. In this embodiment, the grating pitch is changed in correspondence with the change in number of steps between the grating lines.

A color image reading apparatus according to still another embodiment of the present invention will be described below.

Figure 18:
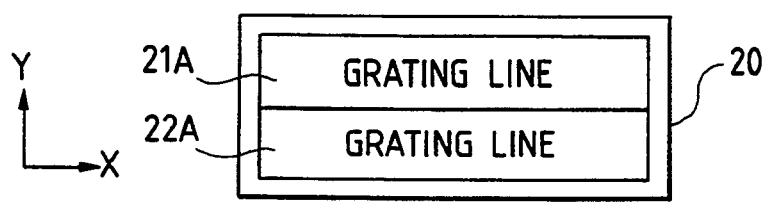
FIG. 18 is a view for explaining a diffraction grating according to still another embodiment of the present invention.
Figure 19:
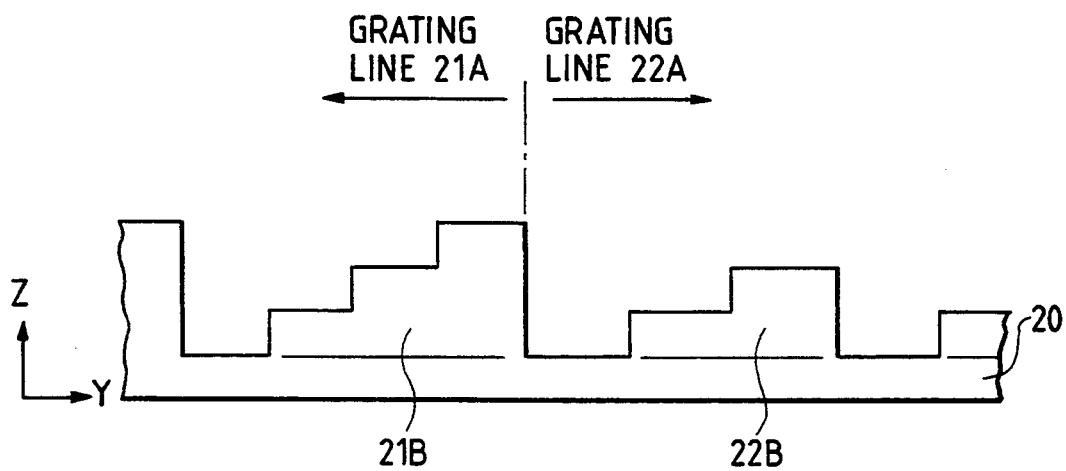
FIG. 19 is an enlarged view for explaining a portion of the diffraction grating of the embodiment of the present invention shown in FIG. 18.

This embodiment is different from the above-mentioned embodiment shown in FIGS. 12A and 12B in that, as shown in FIGS. 18 and 19, a diffraction grating 33 is divided into two regions in the direction of period (direction of color separation), and a grating line 21A having four steps and a grating line 22A having three steps are separately formed in these regions. Note that FIG. 18 is a view showing the outer appearance of the diffraction grating of this embodiment, and FIG. 19 is an enlarged view for explaining a portion of the diffraction grating.

Forming the diffraction grating as described above also makes it possible to obtain substantially the same spectral characteristics as those shown in FIG. 17, yielding an effect similar to that of the embodiment shown in FIGS. 12A and 12B.

In addition, when a replica technique, such as a 2P method, is used in the manufacture of the diffraction grating of this embodiment (or the diffraction grating of the embodiment shown in FIGS. 5A and 5B), matrices can be manufactured independently of each other. This improves the ease in the manufacture of the matrices.

When a diffraction grating is manufactured in this manner, however, a higher accuracy is required for the incident positions of light beams on the diffraction grating than in the above-mentioned embodiment shown in FIGS. 12A and 12B. This accuracy of incident positions, however, is not a serious problem because it can be controlled easily upon assembly of the diffraction grating.

A color image reading apparatus according to still another embodiment of the present invention will be described below.

A reflecting-type one-dimensional blazed diffraction grating of this embodiment, as shown in FIGS. 12A and 12B, reflectively diffracts incident light beams into three directions of −1st-order light 5, 0th-order light 6, and +1st-order light 7, imaging them as light beams of convergent spherical waves formed by an imaging optical system on the surfaces of respective corresponding line sensors. Of the convergent spherical waves, light beams incident on the diffraction grating from the upper and the lower sides in FIG. 12B with respect to the optical axis in the grating pitch section (FIG. 12B) (sub-scanning section) are different in angle of incidence with respect to the diffraction grating.

For this reason, if the diffraction grating is arranged within the convergent spherical waves formed by the imaging optical system, a difference in angle of reflection diffraction is produced by the difference in incident angle between diffracted light components of the respective orders on the image formation surface (of a light-receiving element), causing unsharpness on the surface of the light-receiving element.

In this embodiment, therefore, in order to correctly focus (form images of) light beams, color-separated by the diffraction grating, on the surface of the line sensor, the grating pitch of the diffraction grating is changed in a way which continuously decreases the grating pitch from one peripheral portion to the other, i.e., from the upper to the lower peripheral portion in FIG. 12B. This effectively prevents unsharpness on the surface of the line sensor due to the difference in angle of incidence between light beams.

This optical effect can also be applied to the embodiment shown in FIGS. 12A and 12B and the embodiment shown FIGS. 18 and 19 mentioned earlier. That is, the grating pitches $P_1$ and $P_2$ of the diffraction grating 33 are continuously changed as described above using them as the central values for incident light beams on the optical axis. This can prevent unsharpness on the surface of the line sensor when the diffraction grating is arranged within the convergent spherical waves formed by the imaging optical system.

According to the present invention, in reading a color image by light-receiving means consisting of a monolithic three-line sensor by using a one-dimensional blazed diffraction grating as color-separating means, the spectral characteristics of light beams separated into color light components of R, G, and B can be set to desired spectral characteristics on the surface of the three-line sensor by properly setting the grating heights and the numbers of steps of the diffraction grating. In addition, the color reproducibility of color images can be improved by widening the spectral energy band of a light beam in each of ±1st-order light components. As a result, there can be provided a color image reading apparatus capable of digitally reading color images of three light components R, G, and B with a high precision.

What is claimed is:

1. An image reading apparatus comprising:
   light-receiving means in which a plurality of line sensors are arranged on one substrate;
   an imaging optical system for forming an image of an object to be imaged on said light-receiving means; and
   a blazed diffraction grating, arranged in an optical path between said imaging optical system and said light-receiving means, for color-separating a light beam from the object to be imaged into a plurality of light components, said diffraction grating having at least first and second kinds of grating lines, each kind of grating line having a different maximum height.

2. An apparatus according to claim 1, wherein each grating line is either of said first kind or of said second kind.

3. An apparatus according to claim 1, wherein the entire region of said diffraction grating is divided into a plurality of area, and the grating height is changed for each area.

4. An apparatus according to claim 1, wherein a pitch between adjacent grating lines of a said first kind is different from a pitch between adjacent grating lines of said second kind.

5. An apparatus according to claim 1, wherein in said light-receiving means, said plurality of line sensors are arranged parallel to each other with finite distances therebetween.

6. An apparatus according to claim 1, wherein said blazed diffraction grating color-separates a light beam from the object to be imaged into a plurality of light components in a direction perpendicular to a direction of pixel arrays of said line sensors.

7. An apparatus according to claim 1, wherein the object to be imaged is scanned in a sub-scanning direction perpendicular to a direction of pixel arrays of said line sensors.

8. An apparatus according to claim 1, wherein said blazed diffraction grating is a one-dimensional blazed diffraction grating.

9. An apparatus according to claim 1, wherein said imaging optical system is an exit-type telecentric system.

10. An image reading apparatus comprising:
    light-receiving means in which a plurality of line sensors are arranged on one substrate;
    an imaging optical system for forming an image of an object to be imaged on said light-receiving means; and
    a blazed diffraction grating, arranged in an optical path between said imaging optical system and said light-receiving means, for color-separating a light beam from the object to be imaged into a plurality of light components, said diffraction grating having at least first and second kinds of grating lines, having a first number of steps and a second number of steps, respectively, the first number and second number being different from one another.

11. An apparatus according to claim 10, wherein the number of steps of one of a pair of adjacent grating lines is different from the number of steps of the other of the pair of adjacent grating lines.

12. An apparatus according to claim 10, wherein the entire region of said diffraction grating is divided into a plurality of areas, and the number of steps if changed for each area.

13. An apparatus according to claim 10, wherein a pitch between adjacent grating lines of said first kind is different from a pitch between adjacent grating lines of said second kind.

14. An apparatus according to claim 10, wherein in said light-receiving means, said plurality of line sensors are arranged parallel to each other with finite distances therebetween.

15. An apparatus according to claim 10, wherein said blazed diffraction grating color-separates a light beam from the object to be imaged into a plurality of light components in a direction perpendicular to a direction of pixel arrays of said line sensors.

16. An apparatus according to claim 10, wherein the object to be imaged is scanned in a sub-scanning direction perpendicular to a direction of pixel arrays of said line sensors.

17. An apparatus according to claim 10, wherein said blazed diffraction grating is a one-dimensional blazed diffraction grating.

18. An apparatus according to claim 10, wherein said imaging optical system is an exit-type telecentric system.

* * * * *

UNITED STATES PATENT AND TRADEMARK OFFICE
CERTIFICATE OF CORRECTION

PATENT NO. : 5,362,957

DATED : November 8, 1994

INVENTORS : TAKEHIKO NAKAI ET AL.

Page 1 of 3

It is certified that error appears in the above-identified patent and that said Letters Patent is hereby corrected as shown below:

Title page,

AT [56] REFERENCES CITED

After the listed U.S. Patent Documents, insert,
```
   --5,113,286  12/1992......359/569
     3,883,232   5/1975......350/314
     5,177,349   1/1993......250/208
     5,187,358   2/1993......250/208
     5,113,067   5/1992......250/208
```
Title page, item [30]
FOREIGN PATENT DOCUMENTS
```
     0457281   11/1991 European Pat. Off..
     0193993    9/1986 European Pat. Off..
     2214370    8/1990 Japan.
```
Title page, item [56] under References Cited, column 2, line 2,
OTHER PUBLICATIONS Optical Engineering, Vol. 31, No. 2, Feb. 1992,
Bellingham, WA, US,
pp 251-257, Wyrowski "Modulation Schemes of Phase Gratings."
Applied Optics, Vol. 17, No. 15, August 1, 1978,
New York, NY, US
pp 2273-2279, Dammann "Color Separation Gratings.--

UNITED STATES PATENT AND TRADEMARK OFFICE
CERTIFICATE OF CORRECTION

PATENT NO. : 5,362,957

DATED : November 8, 1994

INVENTORS : TAKEHIKO NAKAI ET AL.

It is certified that error appears in the above-identified patent and that said Letters Patent is hereby corrected as shown below:

COLUMN 1

"Go," should read --GO,--.

COLUMN 5

Line 61, "$\lambda+1=m\lambda o/\{(m+1-1/n)\}$" should read
--$\lambda+1=m\lambda o/\{m+(1-1/n))\}$--.

COLUMN 6

Line 17, "$\lambda+1=451$ nm." should read --$\lambda+1=451$ nm.
Line 59, "$h=m\lambda o/2\cos\zeta$" should read --$h=m\lambda o/2\cos\theta$--.

UNITED STATES PATENT AND TRADEMARK OFFICE
CERTIFICATE OF CORRECTION

PATENT NO. : 5,362,957

DATED : November 8, 1994

INVENTORS : TAKEHIKO NAKAI ET AL.

It is certified that error appears in the above-identified patent and that said Letters Patent is hereby corrected as shown below:

COLUMN 9

Line 36, "$\lambda+1 \approx m\lambda o/(m+1/n$" should read -- $\lambda+1 \approx m\lambda o/(m+1/n)$ --.

Signed and Sealed this

Thirtieth Day of May, 1995

Attest:

BRUCE LEHMAN

Attesting Officer

Commissioner of Patents and Trademarks